Figure 1:
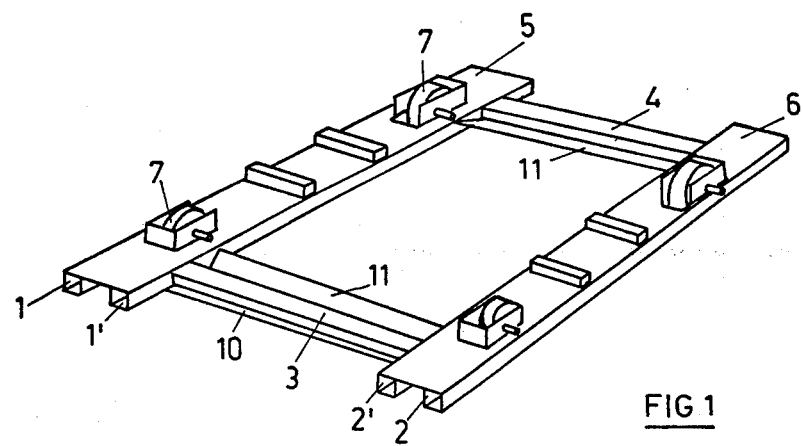

United States Patent [19]
Buhler

[11] 3,942,814
[45] Mar. 9, 1976

[54] MOBILE STORAGE AND TRANSPORT UNIT FOR USE IN A SHELF STORAGE SYSTEM

[75] Inventor: Max A. Bühler, Thalwil, Switzerland
[73] Assignee: Weelpal, A.G., Zug, Switzerland
[22] Filed: Feb. 25, 1975
[21] Appl. No.: 552,961

[30] Foreign Application Priority Data
Feb. 27, 1974 Switzerland.............................. 2875

[52] U.S. Cl............................ 280/79.1; 214/16.4 A
[51] Int. Cl.² ........................................ B62B 5/00
[58] Field of Search........................ 280/79.1, 79.2; 214/16.4 A

[56] References Cited
UNITED STATES PATENTS

| | | | |
|---|---|---|---|
| 3,434,604 | 3/1969 | Haldimann..................... | 214/16.4 A |
| 3,464,713 | 9/1969 | Davidson.......................... | 280/79.1 |
| 3,514,001 | 5/1970 | Meritt............................. | 280/79.1 |
| 3,608,921 | 9/1971 | Wilson............................. | 280/79.1 |

Primary Examiner—Robert R. Song
Attorney, Agent, or Firm—Abraham A. Saffitz

[57] ABSTRACT

A mobile storage and transport unit for use in a shelf storage system. Each unit comprises a first part consisting of a four sided frame in which rollers are housed with their axes of rotation above the frame and a second part which is adapted for receiving and carrying the goods to be stored and is detachably supported on the first part. The frame of the first part comprises two profile cross members, each of them being equipped with a first, protruding member extending towards the outside of the frame in a direction parallel to the frame, and with a second protruding member arranged on the opposite side of said first member on said profile member and extending upwardly inclined towards the inside of the frame.

5 Claims, 3 Drawing Figures

MOBILE STORAGE AND TRANSPORT UNIT FOR USE IN A SHELF STORAGE SYSTEM

In my co-pending U.S. Pat. application, Ser. No. 502,841, filed on Sept. 3, 1974, there is described a shelf storage system, in which the goods to be stored are housed on a mobile storage and transport unit in shelves, conveying mechanisms being provided for transport of the goods in the storage system and auxiliary mechanisms for loading and unloading of the shelves and also for the drive, braking, position maintaining, counting and position changing of the storage and transport units. Each transport and storage unit comprises a first part having a four sided frame in which rollers or wheels are housed with their axes of rotation above the frame and a second part which is adapted for receiving and carrying the goods to be stored and is detachably mounted on the first part.

It proved to be advantageous for the first part of this mobile transport and storage unit to be formed in the kind of a trolley and to be constructed in the following way: There is provided a rectangular frame consisting of two crossmembers and two longitudinal members in pairs on each side. Between the two members of a pair there are disposed two rollers or wheels, their axes of rotation being above the plane of the frame. As a material for constructing such a trolley, there is advantageously used iron or aluminium in the form of hollow profiles with rectangular cross section.

It is an object of the present invention to provide an advantageous improvement of such a trolley, especially in view of it's cooperation with stop members arranged at the ends of the rails and preventing the trolley from running over the ends of the rails and falling off the shelves.

According to one aspect of the present invention, there is provided a mobile storage and transport unit for use in a shelf storage system, in which the sides of the frame without rotatable members each comprise a profile cross member having a first, smaller protruding part extending towards the outsides of the frame in a plane substantially parallel to the plane defined by the frame, and having a second, longer protruding part arranged on the opposite sides of the members and extending upwardly inclined towards the inside of the frame, both of said protruding parts having a width corresponding to the width of the cross members.

According to another aspect of the invention, the first, smaller protruding part lies at least approximately in a plane defined by the lower surface of the frame, while the second, longer protruding part extends upwardly from a plane defined by the lower surface of the frame up to a plane defined by the upper surface of the frame.

Figure 3:
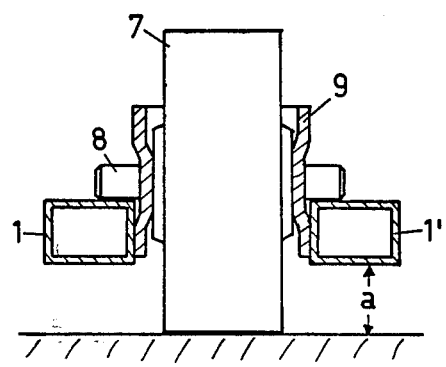
Figure 2:
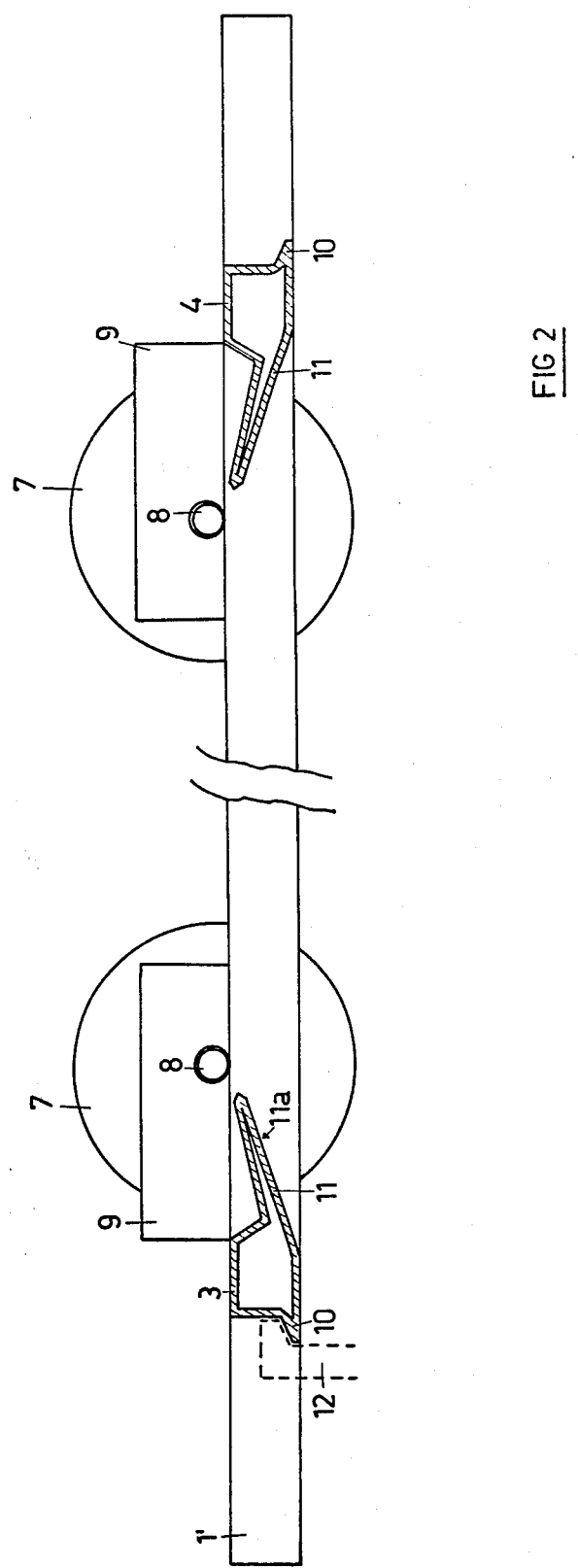

In the following, a preferred embodiment of the invention will be fully described, with reference to the accompanying drawings, in which:

FIG. 1 shows a perspective view of a trolley,
FIG. 2 shows a longitudinal section, and
FIG. 3 shows a cross section through one side of the frame.

As can be seen from FIG. 1, the trolley comprises a frame formed by two pairs of longitudinal members, the one pair being designated with 1, 1' and the pair with 2, 2', and by two cross members 3 and 4. The two longitudinal members 1 and 1' are connected to each other by means of a cover plate 5, while the two longitudinal members 2 and 2' are connected to each other by means of a cover plate 6. The upper surface of these two cover plates 5 and 6 serves as a load receiving area of the trolley for the goods to be transported or stored.

As can be seen from FIGS. 1 and 3, there are provided rollers or wheels 7, disposed between the two longitudinal members 1, 1' and 2, 2' respectively. The rollers or wheels 7 are freely rotatable beared on a shaft 8, the axis of rotation thereof lying above the plane defined by the upper surfaces of the frame. Further there are provided, for each wheel 7, a wheel casing 9 in which the free ends of the shafts 8 are supported. The diameter of the wheels 7 and the position of the shafts 8 is such that the distance between the lower surface of the longitudinal members 1, 1' and 2, 2' and the ground is in the region of 1 to 3 centimeters (ground clearance a in FIG. 3).

The construction and the form of the cross members 3 and 4 can be seen best in FIG. 2. Each of the two cross members 3 and 4 comprises, in cross section, a basically rectangular part with a first, smaller protruding part 10 and a second, longer protruding part 11. The said first protruding part 10 is disposed lies on the side of the cross member 3 and 4 facing the edge of the frame and extends from the cross member 3 in a direction approximately parallel to a plane defined by the lower surface of the frame. It's width is the same as the width of the cross members 3 and 4 and it serves to cooperate with a stop hook 12, shown in dotted lines in FIG. 2.

The said second protruding part 11 is arranged on the opposite side of the cross member 3 and 4, i.e. on the side facing the interior of the frame. It is upwardly inclined and extends from a plane defined by the lower surface of the frame to a plane defined by the upper surface of the frame. Thereby, a guiding surface 11a is formed which extends over the whole width of the cross members 3 and 4.

Whenever the trolley is pulled out of a shelf by lifting it's front side cross member 3, or 4, depending on the direction of movement, over the stop hook 12, the guiding area 11a, always pointing in the direction of movement of the trolley, enables the back side cross member 4, or 3, depending on the direction of movement, to jump over the hook 12 without any obstruction in the movement of the trolley. It is for this reason that the cross members 3 and 4 are arranged symmetrically to the cross axis of the frame, i.e. the two protruding parts 11 always point towards the inner side of the frame, while the two protruding parts 10 always point towards the outside of the frame. Therefore it is of no meaning in which direction the trolley is pulled out of a shelf, i.e. it doesn't matter which of it's sides faces the unloading end of the shelf.

The two cross members 3 and 4 are recessed with respect to the front sides of the trolley. This enables a clear identification or counting of the individual trolleys by mechanical or optical means, even several trolleys move or stand, one directly behind the other, in a column.

What I claim is:

1. A mobile storage and transport unit for use in a shelf storage system comprising
   a first part comprising a four sided frame supported with two pairs of rotatable supports disposed at opposite sides respectively of the frame and with their axes of rotation disposed above the frame,
   a second part adapted to be interchangeably supported on the first part and formed to receive and carry the goods to be stored and transported,
the frame of said first part comprising two longitudinal members and two cross members rigidly connected to form a four sided, right-angled frame, in which the said longitudinal members of opposite sides of the frame each comprise a pair of spaced limbs between which a pair of rotational members are disposed, and in which the cross members of opposite sides of the frame each comprise a profiled member having a first, smaller protruding part extending towards the outsides of the frame in a plane substantially parallel to the plane defined by the frame, and having a second, longer protruding part arranged on the opposite side on said profiled member extending upwardly inclined towards the insides of the frame, both of said protruding parts having a width corresponding to the width of said profiled members.

2. A mobile storage and transport unit as claimed in claim 1, in which said first, smaller protruding part is arranged in a plane defined by the lower surface of the said four sided frame.

3. A mobile storage and transport unit as claimed in claim 1 in which said second, lomger protruding part extends upwardly inclined from a plane defined by the lower surface of said four sided frame up to a plane defined by the upper surface of said four sided frame.

4. A mobile storage and transport unit as claimed in claim 1, in which the said two profiled cross members are arranged symmetrically with respect to the center cross axis of said four sided frame.

5. A mobile storage and transport unit as claimed in claim 1, in which the said two profiled cross members are recessed with respect to the front and back sides of said four sided frame.

* * * * *